UNITED STATES PATENT OFFICE.

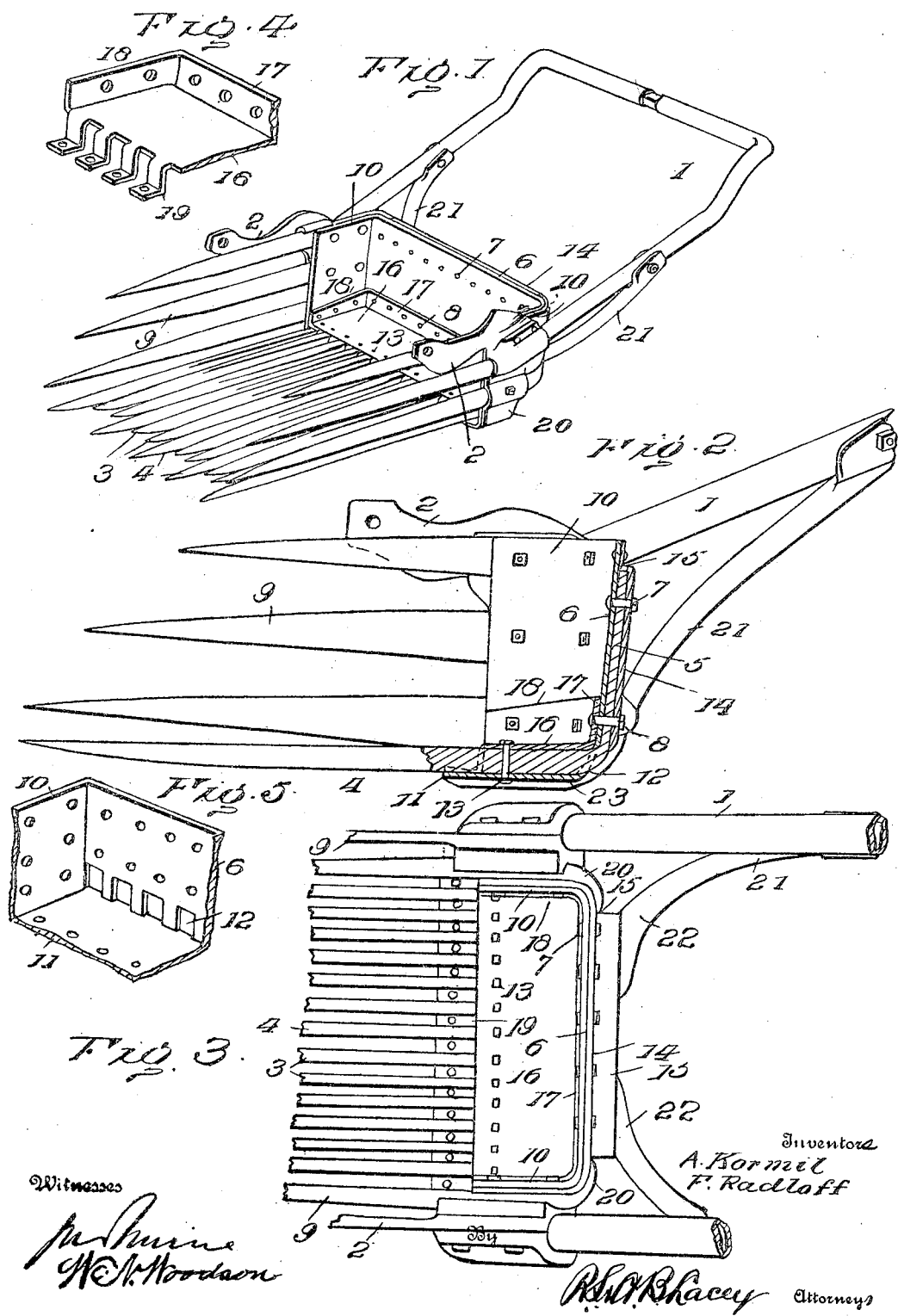

ALEXANDER KORMIL AND FREDRICK RADLOFF, OF GOLDENDALE, WASHINGTON.

FORK SCRAPER.

No. 818,100.     Specification of Letters Patent.     Patented April 17, 1906.

Application filed August 30, 1905. Serial No. 276,444.

*To all whom it may concern:*

Be it known that we, ALEXANDER KORMIL and FREDRICK RADLOFF, citizens of the United States, residing at Goldendale, in the county of Klickitat and State of Washington, have invented certain new and useful Improvements in Fork Scrapers, of which the following is a specification.

This invention relates to a manure-fork, scraper, or like implement which may be used either in the field or on the road for collecting material or matter and conveying the same to a suitable place of deposit, said implement being of the type comprising tines, teeth, or the like and of scoop form and having a solid back and an operating bail or handle for convenience of manipulation in giving proper direction to the scraper in its progress and dumping.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a fork scraper embodying the invention. Fig. 2 is a vertical longitudinal section thereof, showing the parts on a larger scale. Fig. 3 is a plan view of the implement, parts being broken away. Fig. 4 is a detail perspective view of an end portion of the bottom reinforcement. Fig. 5 is a detail perspective view of an end portion of the back.

Corresponding and like parts are referred to in the following description and indicated in all the views of the drawings by the same reference characters.

The scraper in its general appearance is of scoop form and is provided with an upwardly and rearwardly extended bail 1 for convenience of manipulation and with forwardly-extended arms 2 for attachment of the draft or operating tackle. The rear or bowl portion of the scraper is solid and is composed of a number of plates riveted or otherwise fastened, and the forward portion is composed of a series of tines or teeth which will more readily penetrate fertilizer or loose material, such as rock, manure, and compost. The horizontal or bottom tines or teeth are provided in two series 3 and 4, the latter being stouter and longer than the tines 3 and spaced a greater distance apart. The tines or teeth 3 are provided in groups, preferably two to each group, which are arranged between the tines 4. The tines or teeth 4 are made sufficiently stout and heavy to carry the load, whereas the tines 3 serve chiefly to fill the space between the tines 4 and prevent dropping or escape of the material when received upon the fork. The tines 3 may be designated as "fillers," and the tines 4 as "load-carriers." The tines of the different sets are regularly spaced, as shown most clearly in Fig. 3. The rear portion of each tine is bent approximately at a right angle, as shown at 5, and extends upward in the rear of the back 6 and is fastened thereto. The bent portion 5 is apertured to receive the fastenings 7 and 8, which may be bolts or rivets. Tines 9, located at the sides of the scraper, decrease in length from the bottom upward and are of lance form, so as to offer a minimum amount of resistance when the scraper is forced into material to receive a load.

The back portion of the scraper comprises an upright wall 6, end walls 10, and a bottom 11, said parts being preferably of integral formation to obviate the formation of joints and insure the provision of a substantial structure. A series of openings 12 are formed along the lower edge of the back or upright walls 6 adjacent to the bottom 11 and receive the tines or teeth which pass therethrough, thereby enabling said tines to rest upon the bottom 11 and to have their bent ends 5 extend in the rear of the back 6. Fastenings 13 connect the rear portions of the tines with the forward portion of the bottom 11. A back plate 14 covers the bent ends 5 of the tines, and its upper edge is offset, as shown at 15, extending over the upper extremities of the parts 5 and coming close against the upper edge of the back 6, to which it is riveted or otherwise fastened. The back plate 14 serves to strengthen the rear portion of the scraper, as well as to cover the parts 5 and present a practical unbroken surface to prevent lodgment and accumulation of material upon the bent ends 5. This back plate 14 is secured to the upright wall 6 of the back by the same fastenings 7 and 8 employed for fastening the parts 5 and 6. The bottom reinforcement consists of a plate 16, a rear flange 17, end flanges 18, and angle extension 19. The plate 16 rests upon the rear portion of the tines with the rear flange 17 close against the back 6 and the end flanges 18 snug against the ends 10, openings being provided in the flanges 17 and 18 to receive the fastenings used for connecting the component parts comprising the rear portion of the strip. The angle extensions 19 come between the tines 3 and 4 and are riveted or otherwise fastened to the front edge of the bottom 11, as indicated most clearly by the dotted lines in Fig. 2. The parts 19 brace the tines laterally and at the same time close the space formed between the bottom plates 16 and 11 to exclude foreign matter, which would wedge therein and foul the implement, as well as add to its weight and retain moisture, which would tend to cause the parts to corrode.

Plates 20 are secured to the ends 10 of the back and are formed upon their inner faces with depressions to receive the rear ends of the tines 9 and the lower ends of the side bars of the bail 1. The arms 2 are extensions of the plates 20. The plates 20, while reinforcing the ends 10, serve to brace and fix the position of the tines 9 by reason of the depressions which form seats, in which the end portions of said tines 9 and side bars of the bail 1 enter.

The bail 1 is approximately of U form, and the lower ends of the side bars are secured to the rear portion or back of the scraper in any substantial manner and are strengthened by means of braces 21, which have their upper ends of substantially U form to receive the side bars of the bail 1 and their lower portions inwardly curved, as shown at 22, and secured to the rear portion or back of the scraper in any substantial manner. Runners 23 are secured to the lower portion of the back and receive the wear and enable the device to move easily upon the surface over which it may be employed.

Having thus described the invention, what is claimed as new is—

1. A fork scraper comprising a solid back, a series of tines having their rear portions bent to extend in the rear of said back, and a back plate covering the bent ends of the tines and secured to the upright wall of said back portion.

2. A fork scraper comprising a solid back, a series of tines having their rear portions bent to extend in the rear of said back, and a back plate covering the bent ends of the tines and secured to the upright wall of said back portion, said back plate having its upper edge portion offset to extend over the upper extremities of the bent ends and coming close against the upright wall of the back and fastened thereto.

3. In a fork scraper, a back comprising an upright wall and a bottom and having a series of openings along the lower edge of the upright wall, and a series of tines having their rear ends bent to extend in the rear of said upright wall, the tines passing through the openings along the lower edge of said upright wall and resting upon the bottom.

4. In a fork scraper, a back comprising an upright wall and a bottom and having a series of openings along the lower edge of the upright wall, a series of tines having their rear ends bent to extend in the rear of said upright wall, the tines passing through the openings along the lower edge of said upright wall and resting upon the bottom, and a bottom reinforcement overlapping the inner or rear portions of the tines and secured to the bottom of said back.

5. In a fork scraper, a back comprising an upright wall and a bottom and having a series of openings along the lower edge of the upright wall, a series of tines having their rear ends bent to extend in the rear of said upright wall, the tines passing through the openings along the lower edge of said upright wall and resting upon the bottom, and a bottom reinforcement overlapping the inner or rear portions of the tines and secured to the bottom of said back, said bottom reinforcement having a rear and end flanges secured to corresponding parts of the aforesaid back portion of the scraper.

6. In a fork scraper, the combination of a series of tines, and companion plates embracing the rear portion of said tines, one of said plates having extensions coming between the tines and closing the spaces formed between said tines and plates.

7. In a fork scraper, the combination of a bottom plate, a series of tines attached thereto, and a bottom reinforcing-plate arranged above the first-mentioned plate and secured thereto and having angle extensions coming between the tines and attached to the said bottom plate.

8. A fork scraper comprising a back having an upright wall, a bottom and ends and having a series of openings along the lower edge of said upright walls, a series of tines having their rear ends bent to extend in the rear of said upright walls and having the tines passing through the openings in said wall and resting upon the bottom, and a bottom reinforcement having a rear and end flanges attached to corresponding ends of the back and having angle extensions coming between the tines and attached to the forward edge of said bottom.

In testimony whereof we affix our signatures in presence of two witnesses.

ALEXANDER KORMIL. [L. S.]
FREDRICK RADLOFF. [L. S.]

Witnesses:
N. B. BROOKS,
F. A. SMITH.